United States Patent
Giffin et al.

[11] Patent Number: 5,778,822
[45] Date of Patent: Jul. 14, 1998

[54] METHOD AND APPARATUS FOR FILTERING ODORS GENERATED IN A PET LITTER CONTAINER

[75] Inventors: James Wesley Giffin, Southlake; Ronald William Allison, Fort Worth; Joe Benton Carnahan, Flower Mound, all of Tex.

[73] Assignee: Giftech Filter Products, Inc., Southlake, Tex.

[21] Appl. No.: 581,496

[22] Filed: Dec. 29, 1995

[51] Int. Cl.⁶ .................................................. A01K 29/00
[52] U.S. Cl. .................................... 119/165; 119/500
[58] Field of Search ................................ 119/163, 165, 119/161, 500

[56] References Cited

U.S. PATENT DOCUMENTS

| | | | |
|---|---|---|---|
| 4,095,559 | 6/1978 | Griffith | 119/1 |
| 4,517,920 | 5/1985 | Yamamoto | 119/1 |
| 4,546,727 | 10/1985 | Andersen | 119/1 |
| 4,604,110 | 8/1986 | Frazier | 55/74 |
| 4,696,257 | 9/1987 | Neary et al. | 119/1 |
| 5,044,325 | 9/1991 | Miksitz | 119/165 |
| 5,134,972 | 8/1992 | Compagnucci | 119/165 |
| 5,140,948 | 8/1992 | Roberts | 119/165 |
| 5,307,761 | 5/1994 | Berger, III et al. | 119/165 |
| 5,315,964 | 5/1994 | Mimms et al. | 119/165 |
| 5,471,950 | 12/1995 | White | 119/19 |

*Primary Examiner*—Edgar S. Burr
*Assistant Examiner*—Dave A. Ghatt
*Attorney, Agent, or Firm*—James F. Bradley

[57] ABSTRACT

A pet litter container having a covering defines an interior space. A door opening in the covering allows for pet ingress and egress. A plurality of ventilation openings are provided in the covering. A power filter is located in fluid communication with the ventilation openings for removing and filtering odors from the air in the interior space. The power filter includes a power filter housing having an air inlet and an air outlet. An air path is defined by the power filter housing between the air inlet and the air outlet. A low voltage fan is mounted in the housing in the air path for moving air at a predetermined rate from the interior space, through the air inlet, and out the air outlet for exhausting filtered air from the interior space into an interior room in a house or an apartment. A self-contained filter cartridge is removably mounted in the housing in the air path for removing odors from the air in the air path. The power filter housing also includes retention means for releasably retaining the air inlet in fluid communication with the ventilation slots in the covering. In one embodiment, the filter cartridge is slidably mounted in a rectangular power filter housing and may be easily changed by sliding the filter cartridge out of an opening in a sidewall of the power filter housing. By using an adapter plate, the air inlet in the power filter housing may be used on a covering having ventilation openings with an alternate configuration.

23 Claims, 3 Drawing Sheets

METHOD AND APPARATUS FOR FILTERING ODORS GENERATED IN A PET LITTER CONTAINER

BACKGROUND OF THE INVENTION

1. Technical Field

The present invention relates in general to pet litter containers, and in particular to an improved method and system for filtering odors from air removed from inside a pet litter container.

2. Description of the Related Art

Many people keep domestic pets, particularly cats, in a house or an apartment. When the pet does not have free access to a suitable outdoor location for elimination, a litter container or litter box is typically provided in an interior room of the house or apartment. As every cat owner has surely experienced, such a litter container can become offensively odoriferous. In the prior art, many means for moving or removing pungent odors from such pet toilets have been disclosed. For example, several litter box ventilation systems use fans and elongate flexible hoses to carry odorous air completely outside the house. Disadvantages of this type of system include the requirement that the litter container be located near an opening to the outside of the house, and the manipulation of a clumsy, flexible hose which may limit the portability of the pet litter container. Litter box ventilators that exhaust to the outside of the house must also prevent other animals, insects, rodents, or inclement weather from entering the house through the outdoor exhaust opening.

In other vented litter boxes, expensive and complex switch and timer systems are used to turn off the exhaust fan so that the pet feels comfortable enough in the litter box to actually use the litter box.

Other prior art litter box ventilators draw air through the litter material in order to keep odor from emanating from the litter material. Problems with drawing air through the litter material include keeping the ventilation system clean, and creating a particularly harsh environment for the motor used to move the odoriferous air.

Also in the prior art, 120-volt motors have been used in the litter box ventilation systems. Such "line voltage" motors may be a safety hazard to pets that chew on wires or playfully pull on power cords attached to 120-volt blower motors. If the power cord to these 120-volt motors becomes worn due to chewing or playful activity, an electrical hazard for the pet may develop.

With regard to filters in litter boxes, prior art odor-removing filters have not been self-contained, or have not provided an easy way to change the filter material when it is dirty or no longer able to remove odors.

SUMMARY OF THE INVENTION

It is therefore one object of the present invention to provide an improved pet litter container.

It is another object of the present invention to provide an improved method and system for filtering odors from air removed from inside a pet litter container.

The foregoing objects are achieved as is now described. A pet litter container having a covering defines an interior space. A door opening in the covering allows for pet ingress and egress. A plurality of ventilation openings are provided in the covering. A power filter is located in fluid communication with the ventilation openings for removing and filtering odors from the air in the interior space. The power filter includes a power filter housing having an air inlet and an air outlet. An air path is defined by the power filter housing between the air inlet and the air outlet. A low voltage fan is mounted in the housing in the air path for moving air at a predetermined rate from the interior space, through the air inlet, and out the air outlet for exhausting filtered air from the interior space into an interior room in a house or an apartment. A self-contained filter cartridge is removably mounted in the housing in the air path for removing odors from the air in the air path. The power filter housing also includes retention means for releasably retaining the air inlet in fluid communication with the ventilation slots in the covering. In one embodiment, the filter cartridge is slidably mounted in a rectangular power filter housing and may be easily changed by sliding the filter cartridge out of an opening in a sidewall of the power filter housing. By using an adapter plate, the air inlet in the power filter housing may be used on a covering having ventilation openings with an alternate configuration.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
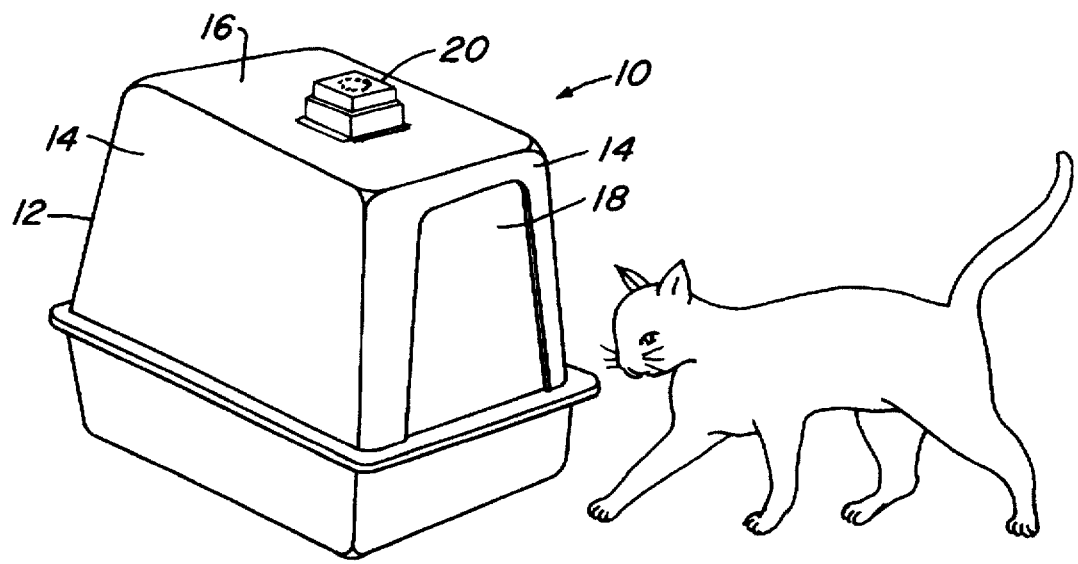
FIG. 1 depicts a pet litter container having a power air filter in accordance with the method and system of the present invention.

With reference now to the figures, and in particular to FIG. 1, there is depicted a pet litter container having a power air filter for removing odors in accordance with the method and system of the present invention. As illustrated, pet litter container 10 is covered by covering 12 that defines an interior space containing the pet litter material. Covering 12 includes sidewalls 14 and top 16. Door opening 18 is provided in one sidewall 14 for pet ingress and egress. Pet litter container 10 is made of a material that is substantially impervious to fluids for holding moisture in the litter material and for preventing odorous air from passing through sidewalls 14 and top 16.

In accordance with the present invention, power air filter 20 is removably mounted in fluid communication with ventilation slots in covering 12 for removing and filtering odors from the air in the interior space of pet litter container 10. Although pet litter container 10 has been shown in FIG. 1 as having a substantially rectangular shape, pet litter container 10 may have a different shape, such as, for example, an igloo shape wherein covering 12 is hemispherically shaped.

Figure 2:
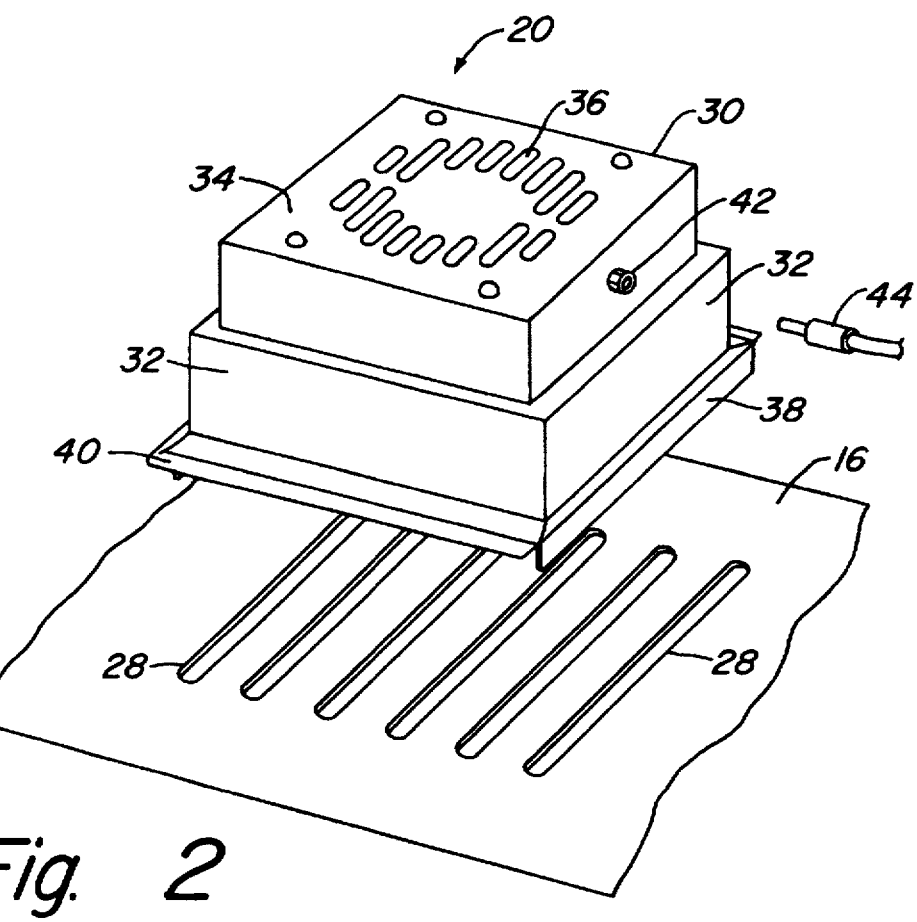
FIG. 2 is a perspective view of a power air filter and the installation of the power air filter in accordance with the method and system of the present invention.

With reference now to FIG. 2, there is depicted a more detailed perspective view of a power air filter in accordance with the method and system of the present invention. As illustrated, power air filter 20 is made to fit into and cover ventilation slots 28 in top 16 in covering 12. Slots 28 are elongated and parallel to each other. However, in other embodiments of the present invention, ventilation "slots" 28 may be a different shape and configuration. Such different shaped "slots" may be referred to as ventilation openings.

Power air filter 20 includes power filter housing 30 which, in the embodiment shown in FIG. 2, is rectangular in shape. Power filter housing 30 includes sidewalls 32 and top 34. Top 34 includes one or more air outlets 36 for exhausting filtered air into an interior room of a home or apartment. Lip 38 downwardly extends from power filter housing 30 and is adapted for positioning an air inlet (not shown in FIG. 2) over ventilation slots 28 and engaging one of the ventilation slots 28 to maintain the location of the air inlet opening relative to ventilation slots 28. As is shown in the embodiment in FIG. 2, lip 38 has a vertical height that permits lip 38 to enter a selected ventilation slot 28, and lip 38 is substantially the same length as the length of ventilation slot 28.

In accordance with an important aspect of the present invention, lip 38 acts as a retention means for releasably retaining power filter housing 30 over ventilation slots 28. In an alternate embodiment where power filter housing 30 must be releasably retained on a sidewall, such as sidewall 14 of covering 12, lip 38 may include an additional curved or hooked edge on the lower portion of lip 38 for retaining power filter housing 30 on sidewall 14, wherein sidewall 14 is not horizontal. This additional hooked edge may provide a way to hang power filter housing 30 in a ventilation opening alternatively located in sidewall 14.

Flange 40 is provided as part of power filter housing 30 to provide a larger area of fluid communication between power filter housing 30 and ventilation slots 28. Flange 40 extends horizontally from the bottom of power filter housing 30 to increase the area of top 16 that is covered by power filter housing 30. By increasing the area of such coverage, odorous air is more likely to be drawn from the interior of pet litter container 10 rather than from along the exterior surface of top 16. In this manner, flange 40 increases the effectiveness of the fluid communication with ventilation slots 28. Preferably, housing 30 and flange 40 completely cover all of the slots 28.

Also shown in FIG. 2 is jack 42 and plug 44. Jack 42 receives low voltage power for a fan inside power air filter 20 from a removable plug 44 that is connected via a power cord to a wall-mounted transformer. Low voltage is used at plug 44 for the safety of the pet using the pet litter container. Because plug 44 is removable, a pet playing with the power cord will remove plug 44 from jack 42 before power air filter 20 is pulled off of top 16.

Figure 3:
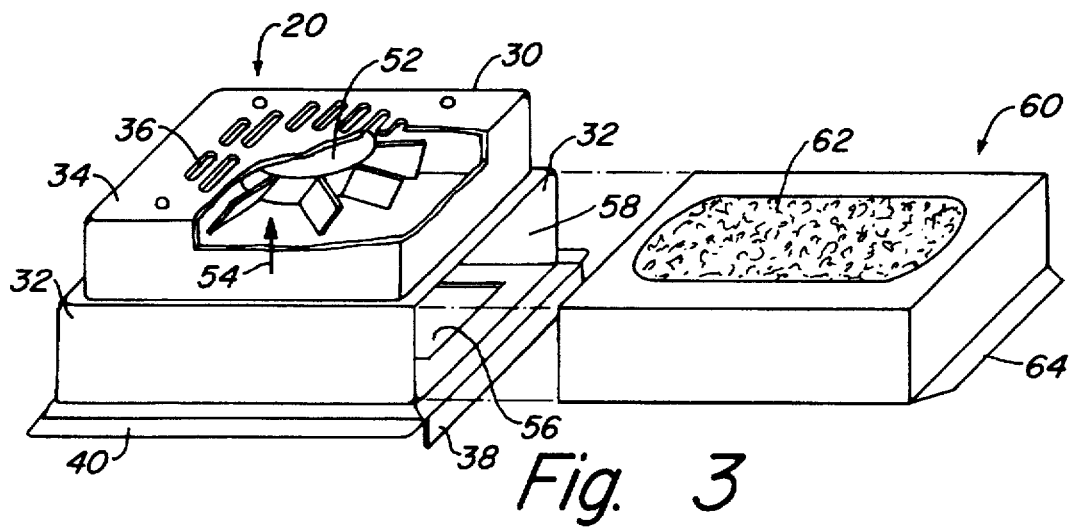
FIG. 3 is a cutaway view of a power air filter housing, and a view of an air filter cartridge in accordance with the method and system of the present invention.

With reference now to FIG. 3, there is depicted a cutaway view of power air filter 20, and a view of an air filter cartridge in accordance with the method and system of the present invention. To draw air through the odor-removing filter material, a conventional low-voltage fan 52 is mounted in air path 54 inside power filter housing 30. Low voltage fan 52 typically operates on power supplied in the range of 6–12 volts dc, and draws air through air path 54 at a rate of between 3 and 12 cubic feet per minute. The rate of air flow is important because air flowing through the odor-removing filter material must remain in contact with the filter material long enough for odors to be absorbed, and the noise caused by flowing air must not frighten or annoy the pet using the litter container.

Air path 54 is formed by power filter housing 30 between air inlet 56 and air outlet 36. As is shown in the embodiment of FIG. 3, air path 54 is substantially straight through power filter housing 30. However, in an alternate embodiment, air outlet 36 may be on a sidewall 32 in which case air path 54 may take a turn through power filter housing 30. In either event, the exhaust is to the atmosphere within the room.

According to another important aspect of the present invention, filter opening 58 is provided in sidewall 32 for easy insertion or removal of filter cartridge 60. In the embodiment shown in FIG. 3, filter cartridge 60 is slidably removable from power filter housing 30. When filter cartridge 60 is installed in power filter housing 30, part of filter cartridge 60 seals filter opening 58 and prevents air from moving through filter opening 58 when filter cartridge 60 is installed. When filter cartridge 60 is installed, odor-removing filter material is supported in a position spanning a cross section of air path 54. Thus, air entering air inlet 56 and exiting air outlet 36 must pass through odor-removing filter material 62. For ease of removal and installation, filter cartridge 60 may be provided with filter cartridge handle 64, or other grasping means such as a flange or tab. To clean or change filter cartridge 60, the user would grasp filter cartridge handle 64 and pull filter cartridge 60 out of power filter housing 30 in a sliding motion, similar to sliding a drawer out of a desk.

Figure 4:
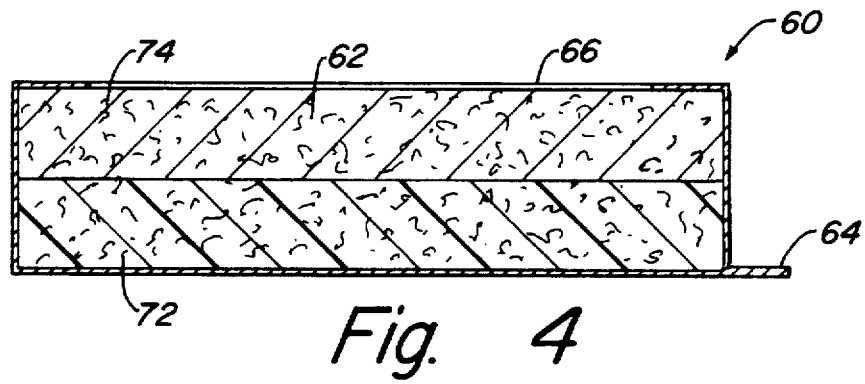
FIG. 4 is a cross section view of an air filter cartridge in accordance with the method and system of the present invention.

With reference now to FIG. 4, there is depicted a cross section view of an air filter cartridge in accordance with the method and system of the present invention. Filter cartridge 60 may include filter frame 66 for providing support for odor-removing filter material 62. Odor-removing filter material 62 includes one or more types of filter material, such as activated carbon 72 and zeolite 74. Activated carbon 72 filters and purifies odorous air by absorbing odors. Zeolite, which is also used to absorb odors, is a hydrous silicate that can act as an ion-exchanger.

Filter frame 66 may also be equipped with filter cartridge handle 64 for providing a way to grasp filter cartridge 60 for removing it from power filter housing 30 when it needs to be changed. Filter frame 66 is preferably made from a material that is more rigid than the filter material. For example, in one embodiment filter frame 66 is made of cardboard. Also note that filter frame 66 has a filter frame inlet and outlet for allowing air to enter and leave filter material 62, and that such inlet and outlet have curved portions 68 at opposite ends of the openings. Curved portions 68 are located closest to and furtherest away from handle 64 to avoid snagging portions of filter housing 30 during insertion or removal of filter cartridge 60.

Figure 5:
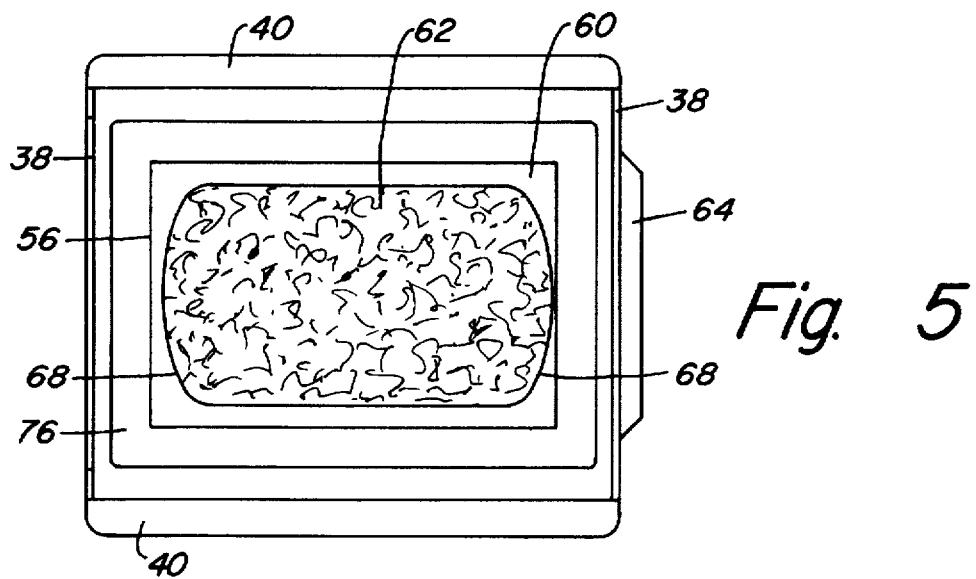
FIG. 5 is an orthographic view of the bottom of a power air filter in accordance with the method and system of the present invention.

With reference now to FIG. 5, there is depicted an orthographic view of the bottom of a power air filter in accordance with the method and system of the present invention. As may be seen in this view, bottom 76 in power filter housing 30 includes air inlet 56. Filter cartridge 60, which includes odor-removing filter material 62, completely occupies the area of air inlet 56 and spans a cross-section of air path 54 which begins at air inlet 56.

Also shown in FIG. 5 are lips 38 which extend downwardly away from power filter housing 30, so that they may be inserted into ventilation slots 28. Flanges 40 may also be seen in FIG. 5 extending from power filter housing 30 in the plain of air inlet 56. Flanges 40 are used to increase the area of coverage around ventilation slots 28 to improve the efficiency of the fluid coupling.

In some embodiments of the present invention, lip 38 may be removed by snapping or breaking the lip away from power filter housing 30. Lip 38 may be removed so that power filter 20 may be placed over ventilation slots 28 that are not spaced apart so that every lip 38 may be inserted into a ventilation slot. Thus, a lip 38 that does not fit into a ventilation slot 28 may be removed by snapping it off of power filter housing 30. In the embodiment shown in FIG. 5, if one lip 38 is removed, another lip 38 will remain in order to releasably retain power filter housing 30 over ventilation slots 28.

Figure 6:
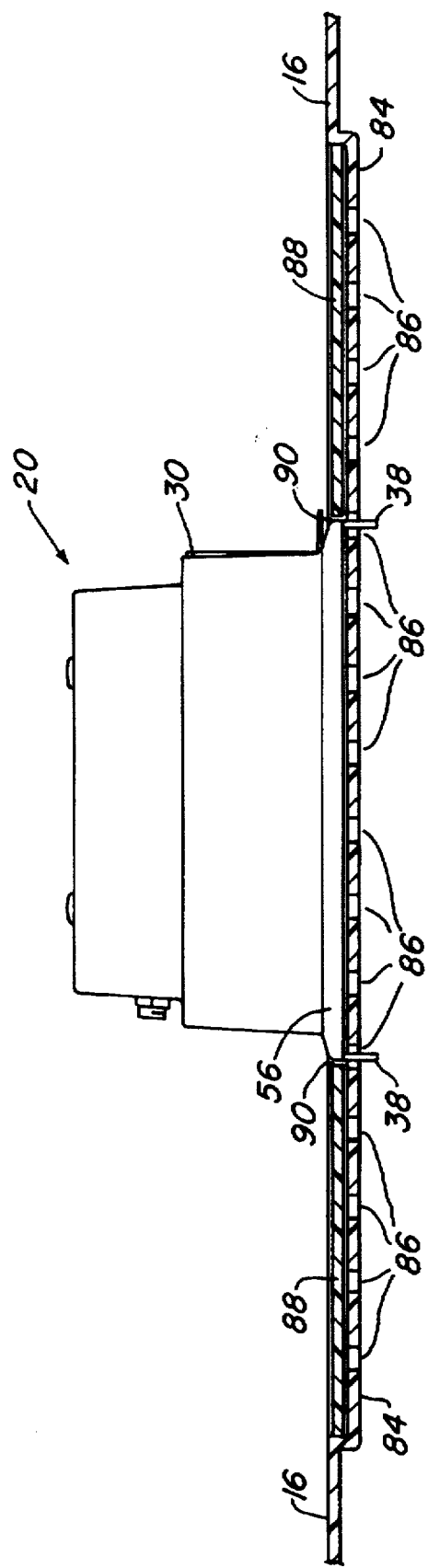
FIG. 6 is a cross section view of an adapter plate installed with a power air filter in accordance with the method and system of the present invention.

Finally, with reference to FIG. 6, there is depicted a cross-section view of an adapter plate installed with a power air filter in accordance with the method and system of the present invention. In many pet litter containers, recessed area 84 may be provided in top 16 of covering 12. Ventilation openings 86 are provided in recessed area 84. In some containers, the dimensions of ventilation openings 86 are larger than the cross-sectional dimensions of housing 30. In order to provide a fluid coupling between air inlet 56 and ventilation openings 86, adaptor plate 88 is used to fit within recessed area 84 and cover ventilation openings 86. Adapter plate 88 also includes adapter opening 90 for receiving lips 38 on power filter housing 30 and for providing an opening for air entering air path 54 through air inlet 56. Thus, adapter plate 88 provides a means for forming a fluid coupling between ventilation openings 86 and recessed area 84 and air inlet 56 in power filter housing 30. In a similar manner, power air filter 20 may be adapted to other alternate ventilation opening configurations in coverings of other pet litter containers.

In operation, power air filter 20 is placed over ventilation slots 28 in covering 12 of a pet litter container 10 to form a fluid coupling between an air moving means, such as low voltage fan 52, and a plurality of ventilation slots 28. Thereafter, air is drawn from the interior space formed by covering 12, utilizing the low voltage fan. After the air in drawn from the interior space, the air, which may contain odors, is passed from the interior space through an odor-removing filter material. And finally, the filtered air is exhausted into an interior room thereby intercepting and filtering odors generated in the interior space of the pet litter container before such odors are allowed to enter the interior room.

The rate at which air is passed through odor-removing filter material 62 should be between three cubic feet per minute and 12 cubic feet per minute. At this range of rates, the odorous air maintains contact with the odor-removing filter material long enough for the filter material to absorb odors from the air. If air is moved at a rate much higher than 12 cubic feet per minute, the pet using the pet litter container may be frightened because of noise so that it refuses to use the litter container. At rates much below three cubic feet per minute, odors may be allowed to escape from door opening 18.

The foregoing description of a preferred embodiment of the invention has been presented for the purpose of illustration and description. It is not intended to be exhaustive or limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A pet litter container for use by a pet within a room comprising:

a pet litter container having a covering that defines an interior space, wherein the covering has a door opening for pet ingress and egress and is made of a material that is substantially impervious to fluids, the covering having a top containing a recessed area;

a plurality of ventilation openings in the recessed area of the covering;

a power filter assembly including a housing having a base, an air inlet, an air outlet, and an air path between the air inlet and air outlet which discharges into a room, the base having dimensions substantially coextensive with the recessed area and releasably retained in the recessed area with the base covering all the ventilation openings and with the air inlet in fluid communication with at least some of the ventilation openings;

a fan located in the housing in the air path for moving air at a predetermined rate from the interior space, through the air inlet and out the air outlet for exhausting air from the interior space into the room; and a filter cartridge removably mounted in the housing in the air path for removing odors from air in the air path.

2. The pet litter container according to claim 1 wherein the ventilation openings comprise parallel elongated slots.

3. The pet litter container according to claim 1 wherein the base of the housing comprises at least one lip downwardly extending from the housing adjacent to the air inlet, the lip being inserted into one of the ventilation openings.

4. The pet litter container according to claim 1 wherein the base of the housing comprises a flange which extends outward from the housing parallel to and overlying a portion of the recessed area.

5. The pet litter container according to claim 1 wherein the housing has a rectangular shape having four sidewalls, and wherein one of the sidewalls has a filter opening for slidably receiving the filter cartridge, allowing the filter cartridge to be changed without removing the housing from the recessed area.

6. The pet litter container according to claim 1 wherein the fan moves air through the air path at a rate of between 3 cubic feet per minute and 12 cubic feet per minute.

7. The pet litter container according to claim 1 wherein the ventilation openings comprise parallel elongated slots; and the base of the housing comprises at least one lip downwardly extending from the housing and inserted into one of the ventilation openings to retain the housing in the recessed area, the length of the lip being substantially the same as a length of the slot in which it is received.

8. The pet litter container according to claim 7 wherein the base of the housing comprises a flange extending from the housing in a plane perpendicular to the lip and overlying a portion of the recessed area.

9. A pet litter container for use by a pet within a room comprising:
- a pet litter container having a covering that defines an interior space, wherein the covering has a door opening for pet ingress and egress and is made of a material that is substantially impervious to fluids;
- a plurality of ventilation openings in the covering;
- a power filter housing having an air inlet, an air outlet, and an air path between the air inlet and air outlet which discharges into a room;
- a fan located in the housing in the air path for moving air at a predetermined rate from the interior space, through the air inlet and out the air outlet for exhausting air from the interior space into the room;
- a filter cartridge removably mounted in the housing in the air path for removing odors from air in the air path;
- retention means for releasably retaining the power filter housing over the ventilation openings with the air inlet in fluid communication with the ventilation openings; and
- wherein the covering has a top having a recessed area with the ventilation openings being located in the recessed area, the pet litter container further including an adapter plate adapted to fit within the recessed area, the adapter plate further having an adapter opening for receiving the retention means and coupling with the air inlet in the power filter housing.

10. A power air filter for removing odors emitted by a pet litter container having a cover with a top having a recessed area with a plurality of vent openings, the power air filter comprising:
- a power air filter housing having an air inlet opening and an air outlet opening, wherein the power air filter housing forms an air path between the air inlet opening and the air outlet opening, and wherein the power air filter housing further includes a sidewall having a filter opening;
- a removable air filter cartridge having odor-removing filter material, the filter cartridge having a frame and being slidable through the filter opening and installed in a position spanning a cross section of the air path, the frame having a sidewall which has dimensions coextensive with the filter opening for preventing air from passing through the filter opening;
- retention means for releasably retaining the housing in a recessed area of a pet litter container over at least one vent opening of a cover of a pet litter container, the retention means including at least one lip downwardly extending from the power air filter housing adjacent to the air inlet opening for insertion into one of the vent openings; and
- a fan mounted inside the power air filter housing for moving air through the air path from the air inlet opening to the air outlet opening.

11. The power air filter according to claim 10 further including a flange extending from the power filter housing in a plane perpendicular to the lip for overlying a portion of the recessed area.

12. The power air filter according to claim 10 wherein the fan moves air through the air path at a rate of between 3 cubic feet per minute and 12 cubic feet per minute.

13. A power air filter for removing odors emitted by a pet litter container having a cover with at least one vent opening, the power air filter comprising:
- a power air filter housing having an air inlet opening and an air outlet opening, wherein the power air filter housing forms an air path between the air inlet opening and the air outlet opening, and wherein the power air filter housing further includes a filter opening;
- a removable air filter cartridge having odor-removing filter material installed in a position spanning a cross section of the air Path and preventing air from passing through the filter opening;
- retention means for releasably retaining the housing over at least one vent opening of a cover of a Pet litter container, the retention means including at least one lip downwardly extending from the Power air filter housing adjacent to the air inlet opening for insertion into the vent opening;
- a fan mounted inside the power air filter housing for moving air through the air path from the air inlet opening to the air outlet opening, wherein air in the pet litter container is drawn out of the pet litter container, through the odor-removing filter material for removing odors, and exhausted into an interior room; and
- wherein the power filter further includes an adapter plate adapted to fit coextensively within a recessed area in the cover of the pet litter container, the recessed area having the at least one vent opening, the adapter plate further having an adapter opening for receiving the downwardly extending lip and coupling with the air inlet opening in the power filter housing.

14. A power air filter for removing odors emitted by a pet litter container having a top with a recessed area containing a plurality of spaced apart elongated vent slots, comprising:
- a housing having a plurality of sidewalls, an air inlet opening and a base with dimensions substantially coextensive with the recessed area of the top of a pet litter container;
- retention means for releasably retaining the housing in the recessed area with the base covering all vent slots of the recessed area and with the air inlet opening in fluid communication with at least some of the vent slots;
- an air outlet opening in the housing;
- an air path between the air inlet opening and the air outlet opening;
- a removable air filter cartridge having odor-removing filter material installed in the housing in a position spanning a cross section of the air path; and
- a fan mounted inside the power air filter housing for moving air through the air path from the air inlet opening to the air outlet opening.

15. The power air filter according to claim 14 wherein the base of the housing comprises a flange extending from the power filter housing in a plane perpendicular to the air path.

16. The pet litter container according to claim 14 wherein the fan moves air through the air path at a rate of between 3 cubic feet per minute and 12 cubic feet per minute.

17. The power air filter according to claim 14 wherein the base of the housing comprises adapter means for covering any of the vent slots in the recessed area not located under the housing, the adapter means including an adapter plate which has an opening for registry with the housing, the adapter plate being dimensioned to fit coextensively within the recessed area.

18. A method for filtering odors from air in a pet litter container, the method comprising the steps of: providing a pet litter container having a bottom tray, sidewalls, and a top that define an interior space, wherein the top has a recessed area containing a plurality of spaced apart ventilation openings, and one of the sidewalls has a door opening for pet ingress and egress, providing a power filter assembly including a housing having an air inlet opening, and an air outlet, a fan, and a filter;

placing and retaining the housing over some of the ventilation openings in the recessed area of a pet litter container;

blocking the ventilation openings not covered by the housing;

drawing air from interior space of the pet litter container utilizing the fan;

passing the air from the interior space through the filter to remove odor from the air; and exhausting air that has passed through the filter to an interior room.

19. The method for filtering odors from air in a pet litter container according to claim 18 wherein the step of blocking the ventilation openings not covered by the housing comprises placing an adapter plate over the ventilation openings.

20. The method for filtering odors from air in a pet litter container according to claim 18 wherein the step of placing and retaining the housing includes:

providing the housing with a downward depending lip;

aligning the lip with a selected one of the plurality of ventilation openings;

inserting the lip into the selected ventilation opening and engaging the selected ventilation opening; and covering the plurality of ventilation openings with the air inlet opening of the housing.

21. The method for filtering odors from air in a pet litter container according to claim 18 wherein the step of blocking ventilation openings not covered by the housing comprises:

providing an adapter plate with dimensions coextensive with the recessed area and with an adapter opening;

placing the adapter plate in the recessed area; and placing the housing on the adapter plate in registry with the adapter opening.

22. A pet litter container filter for filtering odors from air in a pet litter container comprising:

odor-removing filter material having an inlet surface, an outlet surface, and a filter air path through which air travels from the inlet surface to the outlet surface, the filter air path having an air path length, and the odor-removing filter material having a ratio of area over the inlet surface to air path length in the range of 6 to 24;

an air filter frame made of a material more rigid than the filter material located parallel to the filter air path near the outer edges of the inlet surface and outlet surface;

grasping means located on a portion of the air filter frame for facilitating insertion and removal of said pet litter container filter; and wherein the air filter frame encloses the outer periphery of the inlet and outlet surfaces and extends over a portion of the inlet and outlet surfaces to define a filter frame inlet on the inlet surface side of the odor-removing filter material and define a filter frame outlet on the outlet surface side of the odor-removing filter material, and wherein portions of the filter frame inlet and outlet closest to and furthest away from the grasping means are curved to avoid snagging the filter frame inlet and the filter frame outlet during insertion or removal of the filter.

23. The pet litter container filter according to claim 22 wherein the grasping means is a flange extending from the air filter frame.

* * * * *